United States Patent
Gonnon et al.

(10) Patent No.: US 6,960,624 B2
(45) Date of Patent: *Nov. 1, 2005

(54) METHOD OF IMPROVING THE MECHANICAL STRENGTH, PARTICULARLY THE STRENGTH "AT YOUNG AGES" OF CEMENT MATRICES, AND THE CEMENT MATRICES OBTAINED THEREBY

(75) Inventors: Pascal Gonnon, Villeneuve (FR); Yves Kensicher, Lozanne (FR); Christian Jacquemet, Lyons (FR)

(73) Assignee: Coatex S.A.S., Genay (FR)

(*) Notice: Subject to any disclaimer, the term of this patent is extended or adjusted under 35 U.S.C. 154(b) by 0 days.

This patent is subject to a terminal disclaimer.

(21) Appl. No.: 10/452,381

(22) Filed: Jun. 3, 2003

(65) Prior Publication Data

US 2003/0203996 A1 Oct. 30, 2003

Related U.S. Application Data

(63) Continuation of application No. 09/983,719, filed on Oct. 25, 2001, now Pat. No. 6,713,553.

(30) Foreign Application Priority Data

Oct. 25, 2000 (FR) .............................. 00 13661

(51) Int. Cl.$^7$ ..................... C08F 220/06; C08F 220/10; C08F 220/26
(52) U.S. Cl. ..................... 524/556; 524/558; 524/560; 524/589; 524/5; 106/638; 106/727; 106/719; 106/703; 106/706
(58) Field of Search ................ 524/5, 8, 431, 524/445, 447, 556, 589, 558, 560; 523/334

(56) References Cited

U.S. PATENT DOCUMENTS

| | | | | |
|---|---|---|---|---|
| 4,686,252 A | * | 8/1987 | Burge et al. | .................... 524/3 |
| 5,998,526 A | * | 12/1999 | Suau et al. | .................. 524/425 |
| 6,057,398 A | * | 5/2000 | Blum | .......................... 524/507 |
| 6,402,831 B1 | * | 6/2002 | Sawara et al. | .............. 106/738 |
| 6,660,799 B1 | * | 12/2003 | Kensicher et al. | .......... 524/555 |
| 2002/0077390 A1 | | 6/2002 | Gonnon et al. | |
| 2002/0091177 A1 | * | 7/2002 | Gonnon et al. | ................. 524/5 |

OTHER PUBLICATIONS

J.A.Brydson, Plastics Materials, 1999, Butterworth Scientific, 7$^{th}$ Ed., p. 778, lines 1–5.*
J.A. Brydson; Plastics Materials; Butterworth Scientific, Fourth Edition, pp. 698.

* cited by examiner

*Primary Examiner*—Tatyana Zalukaeva
*Assistant Examiner*—Satya B. Sastri
(74) *Attorney, Agent, or Firm*—Oblon, Spivak, McClelland, Maier & Neustadt, P.C.

(57) ABSTRACT

Cements or hydraulic binders may be prepared by adding an aqueous suspension comprising a ground mineral filler and at least one grinding aid agent to a cement or hydraulic binder. The resulting cement or hydraulic binder has very appreciably improved mechanical properties, particularly the property of "strength at young ages." The grinding aid agent may be a natural or synthetic homopolymer and/or copolymer.

46 Claims, No Drawings

METHOD OF IMPROVING THE MECHANICAL STRENGTH, PARTICULARLY THE STRENGTH "AT YOUNG AGES" OF CEMENT MATRICES, AND THE CEMENT MATRICES OBTAINED THEREBY

BACKGROUND OF THE INVENTION

1. Field of the Invention

The present invention relates to suspensions of mineral fillers, preferably calcium carbonates, and more preferably ground fillers, for example ground calcium carbonates, and additives for producing such suspensions, for example grinding aid agents. The grinding aid agents of the present invention provide suspensions of fillers with improved mechanical properties, particularly the properties of "strength at young ages" of cement matrices or hydraulic binders, or more particularly hydraulic concretes, prepared with these suspensions.

The present invention also relates to mortars, concretes and other compositions based on cement and/or semi-hydrate calcium sulphate, i.e., hydraulic compounds or binders.

2. Discussion of the Background

It is known that cement matrices such as concretes, mortars, grouts, etc, more particularly hydraulic concretes, are used in two main applications: ready-for-use concretes and prefabricated products. In addition, it is known that concrete is composed essentially of a cement and an aggregate as well as water and admixtures or additives.

By granulometry, aggregates are classified into several categories known to those skilled in the art, and defined by the French standard XP P 18-540.

In this standard, the families of aggregates comprise:

0/D fillers, where D<2 mm, and at least 70% of the aggregate passes through a 0.063 mm screen, 0/D fine sands, where D≦1 mm, and less than 70% of the aggregate passes through a 0.063 mm screen, 0/D sands, where 1<D≦6.3 mm, gravels, where D>6.3 mm, d/D fine gravels, where d>1 mm and D≦125 mm, d/D ballasts, where d>25 mm and D≦50 mm, with d and D as defined in this standard.

Such fillers may include ultra-fines which are defined as fillers having a median diameter less than or equal to 20 m measured by means of a Cilas™ 850 or Sedigraph™ 5100 type granulometer (selected according to the granulometry of the filler to be measured). Examples of fillers are, for example, blast furnace cast vitrified slags, fly ash and other additions of silica of high fineness, or calcareous additions such as calcium carbonate.

The incorporation, in cement matrices or hydraulic binders, of fumed silica or siliceous additions, or calcareous additions such as calcium carbonate, is also known. In particular, it is known that calcium carbonate may be used, either as a dispersion in water, or in an aqueous medium without dispersant.

In particular, WO 99/47468 describes the use of calcium carbonate in the form of an aqueous dispersion for preparing concretes. This document is an example of preparing a concrete having a more or less acceptable compromise between ease of handling and resistance to premature aging. However, WO 99/47468 only describes incorporating a dispersant as a liquefier for improving fluidity, which is akin to the known functions of additives in the prior art.

EP 0 271 435, EP 0 725 043 and U.S. Pat No. 5,614,017 describe the use of plasticizers in cements, which improve the compressive strength, or reduce shrinkage, or increase the workability time, measured with an Abrams cone, also referred to as "slump". In EP 0 271 435, the additive acts as a water reducer, which is perfectly in accord with the desirability of having a water/cement (W/C) ratio which is as low as possible in order to improve mechanical strength. In EP 0 725 043, the plasticizer is used at a very low concentration and the technical problem posed is completely different from that of the present invention, and as in U.S. Pat. No. 5,614,017. In the three cases, the aggregate is of the 0/D filler type (as defined above), the calcium carbonate is used as a dry powder rather than in dispersion, and the addition of the admixture is effected at the time of preparation of the concrete, that is to say subsequent to, rather than before the preparation of the concrete.

It is also known that admixtures can be used for deflocculating the cement paste and/or reducing the quantity of water in the cement. In this regard, it is known that if the proportion of water increases in a cement matrix or hydraulic binder, the mechanical strength is reduced. One of skill in the art, therefore, always endeavours, in their formulations, to reduce the water/cement ratio (W/C). However, one of skill in the art also knows that, if the proportion of water increases in a cement matrix or hydraulic binder, the workability thereof (that is to say its ability to be handled, pumped, etc) increases. Thus, one of skill in the art is therefore very often forced to seek a compromise between the mechanical properties and workability of such cement matrices or hydraulic binders.

One of the most important mechanical properties of cement matrices or hydraulic binders, for one of skill in the art, concerns the "strength at young ages" of the cement matrix or hydraulic binder. This property is defined as the change in the compressive strength curve, according to the age of preparation of the cement matrix or hydraulic binder, in the region of from 0 hours to 7 days following the preparation of the cement matrix or hydraulic binder. Normally, a measurement is made at 2 days and 7 days.

As discussed above, there is an important and recognised need for significantly increasing the strength at young ages property, without negatively affecting other advantageous properties, such as for example workability.

SUMMARY OF THE INVENTION

Accordingly, it is an object of the present invention to provide a method of preparing a cement matrix or hydraulic binder comprising adding an aqueous suspension comprising a ground mineral filler and at least one grinding agent to cement or hydraulic binder.

It is yet another object of the present invention to provide a cement matrix or hydraulic binder, prepared by combining a cement or hydraulic binder, and an aqueous suspension comprising at least one ground mineral filler and at least one grinding aid agent.

DETAILED DESCRIPTION OF THE INVENTION

Thus, in a first embodiment, the present invention provides a method of preparing a cement matrix or hydraulic binder comprising adding an aqueous suspension comprising a ground mineral filler and at least one grinding agent to cement or hydraulic binder. In combination with the other ingredients, the mineral filler and grinding aid greatly increase the mechanical strength, and in particular the strength at young ages, of a cement matrix or hydraulic binder.

The invention therefore relates to a method for conferring on cement matrices or hydraulic binders such as concretes, mortars, grouts or compositions based on calcium sulphate hemihydrate, improved mechanical strength and notably improved mechanical strength at young ages.

The aqueous suspension of ground mineral filler is prepared by the addition of the grinding aid agent or agents to the mineral filler when the mineral filler is ground. In other words, the grinding aid agent or agents are not incorporated directly in the cement matrix or hydraulic binder.

The grinding aid agents of the present invention are natural or synthetic homopolymers and/or copolymers. A copolymer family is described in French patent application N° 9905665 of the Applicant, (not published at the time of filing the present application). However, the copolymers described therein have the function of appreciably improving the workability of hydraulic binders. Thus, one of skill in the art would not seek to use such a workability agent as a grinding aid agent in the preparation of a suspension of mineral filler used in the manufacture of cement matrices or hydraulic binders. Likewise, it is not known in the art to prepare a cement matrix by means of suspensions containing at least one grinding aid agent.

Synthetic homopolymers or copolymers may be obtained by the polymerisation of ethylenically unsaturated monomers, by polycondensation, or by ring opening polymerisation.

The polymer or polymers obtained by polycondensation or by ring opening polymerisation comprise polyaspartates and derivatives thereof, or polylactates, as well as water-soluble polyesters, polyamides or polylactones.

The ethylenically unsaturated monomer or monomers may be selected from at least one of the ethylenically unsaturated anionic monomers such as acrylic and/or methacrylic acid, itaconic, crotonic or fumaric acid, maleic anhydride or isocrotonic, aconitic, mesaconic, sinapic, undecylenic or angelic acid, 2-acrylamido-2-methyl-1-propane sulphonic acid, 2-methacrylamido-2-methyl-1-propane sulphonic acid, 3-methacrylamido-2-hydroxy-1-propane sulphonic acid, allylsulphonic acid, methallylsulphonic acid, allyloxybenzene sulphonic acid, methallyloxybenzene sulphonic acid, 2-hydroxy-3-(2-propenyloxy)propane sulphonic acid, 2-methyl-2-propene-1-sulphonic acid, ethylene sulphonic acid, propene sulphonic acid, 2-methyl propene sulphonic acid, styrene sulphonic acid, vinyl sulphonic acid, sodium methallylsulphonate, sulphoethyl or sulphopropyl acrylate or methacrylate, sulphomethacrylamide, sulphomethylmethacrylamide, alkylene glycol acrylate or methacrylate phosphate or phosphonate or sulphate or sulphonate, or vinyl phosphonate, or may be selected from at least one non-ionic monomer such as acrylamide or methacrylamide or derivatives thereof, $C_1$ to $C_{40}$ acrylic or methacrylic acid alkyl-esters, vinyl acetate, vinylpyrrolidone, styrene or α-methylstyrene.

The ethylenically unsaturated monomer or monomers may also be selected from at least one alkoxy-, aryloxy-, alkylaryloxy-, arylalkyloxy-polyalkylene glycol ethylenic urethane monomer, sometimes referred to as special urethane monomer, or an alkoxy-, aryloxy-, alkylaryloxy- or arylalkyloxy-polyalkylene glycol ethylenic ester monomer such as an alkoxy-polyalkylene glycol acrylate, methacrylate or hemialeate or an oxyalkylated, oxyarylated, oxyarylalkylated or oxyalkylarylated alkoxy-, aryloxy-, alkylaryloxy- or arylalkyloxy-acrylate or methacrylate or hemimaleate (the alkylene, arylene, alkylarylene or arylalkylene oxide number being between 1 and 120), or an alkoxy-, aryloxy-, alkylaryloxy- or arylalkyloxy-polyalkylene glycol ethylenic ether monomer, and optionally one or more ethylenic monomers having at least two polymerizable double bonds, referred to as a cross-linking agents, chosen non-limitatively from the group consisting of ethylene glycol dimethacrylate, divinylacetylene, divinylbenzene, trimethylolpropanetriacrylate, allyl acrylate, methylene-bis-acrylamide, methylene-bis-methacrylamide, tetrallyloxyethane, the triallylcyanurates, allyl ethers obtained from polyols such as pentaerythritol, sorbitol, sucrose or others.

Preferably, the polymers of the present invention are either homopolymers of acrylic or methacrylic acid or the copolymers obtained by the radical copolymerization of at least one anionic monomer with, optionally, at least one alkoxy-, aryloxy-, alkylaryloxy- or arylalkyloxy-polyalkylene glycol ethylenic ester, ether or urethane monomer and more particularly alkoxy-PEG (polyethylene glycol) urethane, and possibly at least one non-ionic monomer in the possible presence of alkoxy-, aryloxy-, alkylaryloxy- or arylalkyloxy-polyalkylene glycol acrylate or methacrylate or hemialeate and more particularly alkoxy-, aryloxy-, alkylaryloxy- or arylalkyloxy-PEG acrylate or methacrylate or hemialeate, the said PEG (polyethylene glycol) having a molecular weight greater than 300, and in the optional presence of ethylenic monomers having at least two polymerizable double bonds, also referred to as cross-linking agents, chosen from the group consisting of ethylene glycol dimethacrylate, divinylacetylene, divinylbenzene, trimethylolpropanetriacrylate, allyl acrylate, methylene-bis-acrylamide, methylene-bis-methacrylamide, tetrallyloxyethane, the triallylcyanurates, allyl ethers obtained from polyols such as pentaerythritol, sorbitol, sucrose or others.

In some cases, the polymers of the present invention may be homopolymers or copolymers or ethylenically unsaturated cationic monomers such as methacrylamido propyl trimethyl ammonium chloride or sulfate, trimethyl ammonium ethyl methacrylate chloride or sulfate, as well as the corresponding quaternized or unquaternized acrylates or acrylamides and/or the dimethyldiallyl ammonium chloride.

The polymer used as a novel agent for improving strength at young ages for cement matrices or hydraulic binders according to the invention is prepared by the known processes of radical polymerization in a solution, in an emulsion, in a suspension or by precipitation of the aforementioned monomer or monomers, in the presence of a catalytic system and known transfer agents, used in appropriate quantities. The molecular weight of the polymer of the present invention may be adjusted by known means such as, for example, adjusting the reaction temperature, the amount of catalyst, the presence or absence of transfer agents, or any other means or combination of means known to one of skill in the polymer synthesis art.

The polymerization catalyst system, which can vary in quantity from 0.1% to 20% by weight with respect to the total weight of monomers, is preferably selected from catalysts which are water-soluble such as, for example, sodium, potassium or ammonium persulphates, azo compounds, or peroxides or hydroperoxides such as, for example, hydrogen peroxide. These catalysts may also be combined with a known reducing compound such as sodium metabisulphite, sodium hypophosphite, phosphorous acid, hypophosphorous acid or metallic salts.

The chain transfer agent is preferably selected from alkyl-mercaptans such as, for example, octanethiol, decanethiol, n-dodecanethiol or t-dodecanethiol or from mercapto-propionic acid, mercapto-succinic acid, thioglycolic acid or mercaptoethanol or secondary alcohols, certain alkyl halides or the salts of phosphorus acids with an oxidation number of less than 5, as well as various other additives, known to one of skill in the polymer art, as a chain limiter.

Throughout the present application, the abbreviations used have the following meaning:

$EGMAPO_4$=ethylene glycol methacrylate phosphate

EGMA=ethylene glycol methacrylate

PEG 350=polyethylene glycol with a molecular weight of 350

PEG 750=polyethylene glycol with a molecular weight of 750 and by analogy any number following the letters PEG indicates the molecular weight of the said PEG.

EA=ethyl acrylate

Acryl=acrylamide

MAA=methacrylic acid

AA=acrylic acid

TEA=triethanolamine

TDI=toluene diisocyanate

IPDI=isophorone diisocyanate

Preferably, the following monomers are polymerized to provide the polymer of the present invention:

a) at least one anionic monomer, b) optionally at least one non-ionic monomer, c) optionally at least one alkoxy-, aryloxy-, alkylaryloxy- or arylalkyloxy-polyalkylene glycol ethylenic ester, ether or urethane monomer, sometimes referred to as a special monomer, d) optionally one of the ethylenic monomers having at least two polymerizable double bonds and referred to as cross-linking agents, e) optionally at least one cationic monomer.

Even more preferably, the polymer of the present invention is prepared from the following ethylenically unsaturated monomers (% by weight):

a) 2% to 100% of at least one anionic monomer, b) 0% to 50% of at least one non-ionic monomer, c) 0% to 95% of at least one alkoxy-, aryloxy-, alkylaryloxy- or arylalkyloxy-polyalkylene glycol ethylenic ester, ether or urethane monomer, sometimes referred to as a special urethane monomer, d) 0% to 3% of one or more ethylenic monomers having at least two polymerizable double bonds and referred to as cross-linking agents, e) 0% to 98% of at least one cationic monomer, the total of monomers a), b), c), d) and e) being equal to 100%.

The preferred anionic monomer or monomers are selected from acrylic acid, methacrylic acid, 2-acrylamido-2-methyl-1-propane sulphonic acid, 2-methacrylamido-2-methyl-1-propane sulphonic acid, 3-methacrylamido-2-hydroxy-1-propane sulphonic acid, allylsulphonic acid, methallylsulphonic acid, allyloxybenzene sulphonic acid, methallyloxybenzene sulphonic acid, 2-hydroxy-3-(2-propenyloxy)propane sulphonic acid, 2-methyl-2-propene-1-sulphonic acid, ethylene sulphonic acid, propene sulphonic acid, 2-methyl propene sulphonic acid, styrene sulphonic acid, vinyl sulphonic acid, sodium methallylsulphonate, sulphopropyl acrylate or methacrylate, sulphomethylacrylamide, sulphomethylmethacrylamide, alkylene glycol acrylate or methacrylate phosphate or phosphonate or sulphate or sulphonate, itaconic acid, maleic anhydride, sodium methallylsulphonate and more particularly chosen from amongst acrylic acid, methacrylic acid, 2-acrylamido-2-methyl-1-propane sulphonic acid, ethylene sulphonic acid, propene sulphonic acid, 2-methylsulphonic acid, ethylene glycol methacrylate phosphate or ethylene glycol acrylate phosphate.

The preferred non-ionic monomer or monomers are selected from acrylamide or methacrylamide or derivatives thereof, the $C_1$, to $C_{40}$ acrylic or methacrylic acid alkyl-esters, vinyl acetate, vinylpyrrolidone, styrene or α-methylstyrene and more particularly from amongst acrylamide or ethyl acrylate.

The alkoxy-, aryloxy-, alkylaryloxy- or arylalkyloxy-polyalkylene glycol ester monomers are particularly selected from alkoxy-, aryloxy-, alkylaryloxy- or arylalkyloxy-polyalkylene glycol acrylates, methacrylates or hemialeates or an oxyalkylated, oxyarylated, oxyarylalkylated or oxylalkylarylated alkoxy-, aryloxy-, alkylaryloxy- or arylalkyloxy-acrylate or methacrylate (the alkylene, arylene, alkylarylene or arylalkylene oxide number being between 1 and 120).

The alkoxy-, aryloxy-, alkylaryloxy- or arylalkyloxy-polyalkylene glycol urethane monomers are particularly chosen from amongst alkoxy-polyalkylene glycols, reaction products of alkoxy-polyalkylene glycol with a polymerizable unsaturated isocyanate and more particularly from the reaction products of methoxy-PEG with an acrylic, methacrylic, vinyl or allyl isocyanate, wherein the PEG has a molecular weight greater than 300.

The ethylenically unsaturated cationic monomer or monomers are particularly selected from methacrylamido propyl trimethyl ammonium chloride or sulfate, trimethyl ammonium ethyl methacrylate chloride or sulfate, as well as the corresponding quaternized or unquaternized acrylates or acrylamides, and/or the dimethyldiallyl ammonium chloride.

The polymer of the present invention may, subsequent to the polymerization step, be fractionated by any fractionation means known to one of skill in the polymer art.

The polymer of the present invention may be in a completely acidic form, or partially or completely neutralized by one or more neutralization agents having a monovalent function and possibly a polyvalent function. For example, neutralization agents having a monovalent function may be selected from the group consisting of compounds containing alkaline cations, in particular sodium, potassium, lithium, or ammonium, or the primary or secondary aliphatic and/or cyclic amines, such as, for example, ethanolamines, mono- or diethylamine or cyclohexylamine. The neutralization agents having a polyvalent function may be selected from the group consisting of compounds containing divalent alkaline-earth cations, in particular magnesium, calcium, and zinc, and trivalent cations, including, in particular, aluminum, or compounds containing cations with a higher valency.

The mineral fillers of the present invention may be selected, but are not limited to, natural calcium carbonate (chalk, calcite, marble or other natural forms of calcium carbonate), precipitated calcium carbonate, barium carbonate, limy rocks, dolomite, talc, ground silica, silicas in general, fumed silica, fumed titanium dioxide, diatomites, iron oxides, manganese oxides, titanium dioxide, lime, kaolin, metakaolins, clays, mica, plasters, fly ash, slag, calcium sulphate, zeolites, basalt, barium sulphate, aluminum trihydroxide, or mixtures thereof.

The suspension of ground mineral filler of the present invention may be prepared by grinding the mineral filler to be refined in the following manner. First, an aqueous suspension of the mineral matter to be refined is formed, containing the mineral matter and the grinding aid agent or agents. Then the mineral filler is ground with a grinding medium consisting of very fine particles in the aqueous medium containing the grinding aid agent or agents.

In a variant of the method of the present invention, it is possible to prepare a suspension of a mixture of fillers by means of co-grinding the fillers. That is, an aqueous suspension of the mineral fillers to be refined is formed, then the mineral fillers are co-ground. Another method of preparing a suspension of a mixture of fillers according to the present invention comprises grinding each of the fillers separately as described above, and then mixing the suspensions of ground filler material together. The dry weight of the suspension may vary from 10% by weight to 85% by weight.

The ground mineral filler may be ground to the ultrafine stage. In particular, the ground mineral filler may be a calcium carbonate ground to the ultrafine stage, having a median diameter of less than or equal to 20 μm measured by means of a Cilas™ 850 or Sedigraph™ 5100 type granulometer (depending on the granulometry of the filler to be measured).

The grinding aid agent is preferably selected from the polymers, according to the present invention, obtained by radical polymerisation and optionally at least one alkoxy-, aryloxy-, alkylaryloxy- or arylalkyloxy-polyalkylene glycol ethylenic ester, ether or urethane monomer and more particularly alkoxy-polyethylene glycol urethane with at least one anionic monomer, and optionally at least one non-ionic monomer in the possible presence of ethylenic monomers having at least two polymerizable double bonds, also referred to as cross-linking agents.

A second object of the present invention is a suspension of filler or a mixture of fillers comprising a ground mineral filler or fillers as described above, and at least one grinding aid agent as defined above.

A third embodiment of the present invention is a cement matrix or hydraulic binder, such as concrete, mortar, grout, or compositions based on cement and/or calcium sulphate hemihydrate, and more particularly hydraulic concrete, prepared by mixing the cement matrix or hydraulic binder with the aqueous suspension of the ground mineral filler or fillers and at least one grinding aid agent of the present invention. Such cement matrices or hydraulic binders have improved strength at young ages.

The cement matrices or hydraulic binders of the present invention, containing the novel grinding aid agent which improves the strength of the cement matrix or hydraulic binder at young ages, may be used in construction, building, public works, civil engineering, offshore works or as petroleum cements and parapetroleum services.

The invention also covers all embodiments and all applications which will be directly accessible to one of skill in the art, from reading the present application, from his own knowledge, and possibly from simple, routine tests.

Having generally described this invention, a further understanding can be obtained by reference to certain specific examples which are provided herein for purposes of illustration only, and are not intended to be limiting unless otherwise specified.

EXAMPLE 1

This example demonstrates an improvement in the mechanical properties of a mortar provided by the use of a suspension of a ground natural calcium carbonate.

In each of the tests of the example, the different constituents of the standard mortar with a 450 kg/m$^3$ cement content were poured into a mortar mixer (EN 196-1) in the operating position. The experiment was carried out on mortars whose rheology, measured with a mortar workability meter defined by NF P 15-412, was between 1 and 3 seconds. The quantities of constituents were adjusted for each of the mortars of the different tests in order to work at constant compactness.

The composition was as follows:
- 450 g of CEM I 42.5R CP2 cement from Gaurain in accordance with NF P 15-301;
- the quantity of ground calcium carbonate suspension to be tested;
- the necessary quantity of water;
- a variable quantity, in grams, of standard Leucate sand (EN 196-1).

The sand was added according to EN 196-1 over 30 seconds and after 30 seconds of slow stirring of the mixture of previously added constituents. After 90 seconds of mixing, the mixer was stopped in order to be able to scrape the walls of the mixer. Once the scraping of the mortar adhering to the walls had ended, the mixing was resumed for 1 minute at fast speed. This procedure provided obtain a mixing cycle which lasted for 4 minutes, in accordance with EN 196-1. At the end of the mixing, the test pieces were formed and placed in a humid climatic chamber (EN 196-1) for between 20 and 24 hours and then removed from the molds, weighed, and placed in a storage vessel. This procedure was in accordance with EN 196-1. At the required age, these test pieces were taken from their storage chamber and then tested under bending and compression in accordance with EN 196-1.

Test N° 1

This test was of a reference mortar with a 450 kg/m$^3$ cement content, without calcium carbonate, and having a water/cement W/C ratio of 0.55.

Test N° 2

This test was of a mortar of the prior art with a 450 kg/m$^3$ cement content using 10% of a calcite powder sold under the name Betocarb™ 2 (based on the dry weight of cement), having a W/C ratio of 0.54.

Test N° 3

This test was of a mortar of the prior art with a 450 kg/M$^3$ cement content using 30% of a calcite powder sold under the name Betocarb™ 2 (based on the dry weight of cement), having a W/C ratio of 0.52.

Test N° 4

This test was of a mortar according to the present invention, with a 450 kg/m$^3$ cement content and having a W/C ratio of 0.55 and having 10% (dry weight, based on the dry weight of cement), of an aqueous suspension of calcium carbonate having a 75% dry matter content, obtained by grinding a calcite to a median diameter of 2 μm (measured with the Sedigraph™ 5100) in the presence of 0.75% (dry weight with respect to the dry weight of calcium carbonate), of a copolymer comprising:
- 15.0% by weight methacrylic acid;
- 65.0% by weight methoxymethacrylate-PEG 750;
- 20.0% by weight methoxymethacrylurethane-PEG 750.

Before the calcite was ground, the aqueous suspension of calcium carbonate was prepared from calcite having a mean diameter of around 50 μm at a dry matter concentration of 75%. Thus, 0.75% by dry weight of the aforementioned grinding aid agent (based on the dry weight of the calcium carbonate), was added into the aqueous suspension of calcium carbonate. The suspension was then circulated in a Dyno-Mill™ type grinder, having a fixed cylinder and rotating impeller, whose grinding medium consisted of corundum balls with a diameter within the range 0.6 mm to 1.0 mm. The total volume occupied by the grinding medium was 1150 cm³, and the weight of the grinding medium was 2900 g. The grinding chamber had a volume of 1400 cm³, the circumferential speed of the grinder was 10 m/s, and the calcium carbonate suspension was recycled at the rate of 18 liters per hour. The outlet of the Dyno-Mill™ grinder was provided with a separator having a 200 μm mesh for separating the suspension resulting from the grinding and the grinding medium. The temperature during the grinding test was maintained at approximately 60° C. The calcium carbonate suspension obtained by this process had the required granulometry measured with a Sedigraph™ 5100 granulometer from Micromeritics.

Test N° 5

This test was of a mortar according to the present invention, having a 450 kg/m³ cement content and with a W/C ratio of 0.49 and using 30% (dry weight, based on the dry weight of cement) of the same aqueous suspension of calcium carbonate as in Test N° 4. In addition, the procedure and the equipment used for the grinding of the calcium carbonate were identical to those of Test N° 4.

The results of measuring the compression strength at 2 days, 7 days and 28 days for the different tests are set out in Table I below.

between 1 to 3 seconds, according to the same procedure as that of the previous example.

Test N° 6

This test was of a reference mortar having a 450 kg/m³ cement content, without calcium carbonate, and with a water/cement W/C ratio of 0.54.

Test N° 7

This test was of a mortar according to the present invention, having a 450 kg/m³ cement content, a W/C ratio of 0.49, and having 10% (dry weight, based on the dry weight of cement) of the aqueous suspension of calcium carbonate described above, with a median diameter of 1.55 μm. The procedure and the equipment used for grinding the calcium carbonate were identical to those of Test N° 4.

Test N° 8

This test was of a mortar according to the present invention, having a 450 kg/m³ cement content, a W/C ratio of 0.44, and having 30% (dry weight, based on the dry weight of cement) of the aqueous suspension of calcium carbonate described above, with a median diameter of 1.55 μm. The procedure and the equipment used for grinding the calcium carbonate were identical to those of Test N° 4.

The results of compression strength measurements at 2 days, 7 days and 28 days for the different tests are set out in Table II below.

TABLE I

| TEST N° | REFERENCE 1 | PRIOR ART 2 | PRIOR ART 3 | INVENTION 4 | INVENTION 5 |
|---|---|---|---|---|---|
| Weight of cement in g | 450 | 450 | 450 | 450 | 450 |
| Weight of sand in g | 1580 | 1534 | 1475 | 1516 | 1516 |
| Weight of calcium carbonate in g | 0 | 45 | 135 | 45 | 135 |
| Effective addition of water in g | 248 | 242 | 234 | 248 | 220 |
| Effective water/cement ratio | 0.55 | 0.54 | 0.52 | 0.55 | 0.49 |
| Workability in seconds | 2.59 | 2.38 | 2.43 | 2.87 | 2.95 |
| Compressive strength in kN at 2 days | 39.7 | 41.5 | 51.8 | 57.1 | 82.1 |
| Compressive strength in kN at 7 days | 64.5 | 67.5 | 77.2 | 80.6 | 99.9 |
| Compressive strength in kN at 28 days | 81.8 | — | — | 96.2 | 115.2 |
| Gain in strength in % at 2 days | 0 | 4.6 | 30.6 | 44 | 107 |
| Gain in strength in % at 7 days | 0 | 4.7 | 19.7 | 25 | 55 |
| Gain in strength in % at 28 days | 0 | — | — | 13 | 35 |

The results of Table I, above, show that the compression strength of mortars according to the present invention (i.e., the strength at 2 days, 7 days and 28 days), are significantly improved by the suspension of ground calcium carbonate (i.e., ultrafine calcium carbonate), ground in the presence of the grinding aid agent, compared to conventional mortars. In particular, the strength of the mortars of the present invention at young ages (i.e., the strength at 2 days and 7 days) is improved compared to conventional mortars,

EXAMPLE 2

This example relates to the use of a suspension of ground calcium carbonate having a different ultrafine granulometry.

A standard mortar having a 450 kg/m³ content was prepared, having a suspension of ground calcium carbonate with a median diameter of 1.55 μm, measured with the Sedigraph™ 5100, using 0.7% of the grinding aid agent of Test N° 4 and with the same equipment and same procedure as Test N° 4. The suspension replaced volumes of water and sand so as to work at constant compactness. In addition, the mortars have a rheology, measured on a workability meter,

TABLE II

| TEST N° | REFERENCE 6 | INVENTION 7 | INVENTION 8 |
|---|---|---|---|
| Weight of cement in g | 450 | 450 | 450 |
| Weight of sand in g | 1580 | 1526 | 1510 |
| Weight of calcium carbonate in g | 0 | 45 | 135 |
| Effective addition of water in g | 242 | 221 | 199 |
| Effective water/cement ratio | 0.54 | 0.49 | 0.44 |
| Workability in seconds | 2.79 | 2.11 | 2.74 |
| Compressive strength in kN at 2 days | 35.4 | 52.9 | 73.5 |
| Compressive strength in kN at 7 days | 60.1 | 77.4 | 91.5 |
| Compressive strength in kN at 28 days | 76.7 | 89.9 | 104 |
| Gain in strength in % at 2 days | 0 | 49 | 107 |
| Gain in strength in % at 7 days | 0 | 29 | 52 |

TABLE II-continued

| TEST N° | REFERENCE 6 | INVENTION 7 | INVENTION 8 |
|---|---|---|---|
| Gain in strength in % at 28 days | 0 | 17 | 35 |

The results of Table II, above, shows that the compression strength (strength at 2 days, 7 days and 28 days)of a mortar according to the present invention are significantly improved by a suspension of ground calcium carbonate having an ultrafine granulometry different from that of the previous example. In particular, the strength at young ages (strength at 2 days and 7 days) is improved.

EXAMPLE 3

This example relates to the improvement in the mechanical properties of a mortar according to the present invention, provided by a suspension of natural calcium carbonate ground in the presence of another type of grinding aid agent.

Thus, a mortar was produced using a suspension having 78% of ground calcium carbonate (as dry matter) having a median diameter of 1.0 μm, measured with the Sedigraph™ 5100, containing 0.48% (dry weight, based on the dry weight of calcium carbonate) of a polyacrylate completely neutralized by 70% sodium ions and 30% calcium ions, using the same procedure and equipment as in Example 1, Test N° 9

This test was of a reference mortar having a 450 kg/m³ cement content, without calcium carbonate, and a water/cement W/C ratio of 0.54.

Test N° 10

This test was of a mortar according to the present invention, having a 450 kg/m³ cement content, a W/C ratio of 0.54, and 10% (dry weight, based on the dry weight of cement) of the aqueous suspension of calcium carbonate described above, with a median diameter of 1.0 μm. The procedure and equipment used for grinding the calcium carbonate were identical to those of Test N° 4.

Test N° 11

This test was of a mortar according to the present invention, having a 450 kg/m³ cement content, a W/C ratio of 0.54, and 30% (dry weight, based on the dry weight of cement) of the aqueous suspension of calcium carbonate described above, with a median diameter of 1.0 μm. The procedure and equipment used for grinding the calcium carbonate were identical to those of Test N° 4.

The results of compression strength measurements carried out at 2 days for the different tests are set forth in Table III, below.

TABLE III

| TEST N° | REFERENCE 9 | INVENTION 10 | INVENTION 11 |
|---|---|---|---|
| Weight of cement in g | 450 | 450 | 450 |
| Weight of sand in g | 1580 | 1535 | 1444 |
| Weight of calcium carbonate in g | 0 | 45 | 135 |
| Effective addition of water in g | 242 | 242 | 242 |
| Effective water/cement ratio | 0.54 | 0.54 | 0.54 |
| Compressive strength in kN at 2 days | 39.7 | 48.6 | 57.4 |
| Gain in strength in % at 2 days | 0 | 22.4 | 44.6 |

The results of Table III, above, show that the compression strength, at young ages (i.e., strength at 2 days) of a mortar according to the present invention are significantly improved by a suspension of calcium carbonate ground with another type of grinding aid agent.

EXAMPLE 4

This example relates to the improvement in the mechanical properties of a mortar provided by a suspension of different ground fillers.

For each of the tests of this example, the different constituents of a standard mortar with a 450 kg/M³ cement content were poured into a mortar mixer (EN 196-1) in the operating position. The quantities of constituents were adjusted for each of the mortars of the different tests in order to work at constant compactness. In addition, the experiment was carried out on mortars whose rheology, measured with a mortar workability meter defined by NF P 15-412, was between 1 and 3 seconds.

The composition of the standard mortar was as follows:
450 g of CEM I 42.5R CP2 cement from Gaurain, according to NF P 15-301;
the quantity of ground filler suspension to be tested (except for the reference, where no suspension is added);
the necessary quantity of water;
a variable quantity, in grams, of standard Leucate sand (EN 196-1).

The sand was added according to EN 196-1 over 30 seconds, and after 30 seconds of slow stirring of the mixture of the previously added constituents. After 90 seconds of mixing, the mixer was stopped in order to scrape the walls of the mixer. Once the scraping of the mortar adhering to the walls had ended, the mixing was resumed for 1 minute at fast speed. Thus, the mixing cycle lasted for 4 minutes and was in accordance with EN 196-1.

At the end of the mixing, the test pieces were formed and placed in a humid climatic chamber (EN 196-1) for between 20 and 24 hours, and then removed from the molds, weighed, and placed in a storage vessel. This procedure was in accordance with EN 196-1. At the required age, these test pieces were taken from their storage chamber and then tested under bending and compression in accordance with EN 196-1.

Test N° 12

This test was of a reference mortar with a 450 kg/m³ cement content, without any filler, and having a water/cement W/C ratio of 0.55.

Test N° 13

This test was of a mortar according to the present invention, having a 450 kg/m³ cement content, a W/C ratio of 0.59, and having 10% (dry weight, based on the dry weight of cement) of an aqueous suspension of fumed silica with a 58.2% dry matter content, obtained by grinding a fumed silica to a median diameter equal to 3.03 μm, measured with the Sedigraph™ 5100, in the presence of 0.75%

(dry weight based on the dry weight of fumed silica) of a copolymer comprising:

- 5.0% by weight methacrylamido propyl trimethyl ammonium chloride, and
- 95.0% by weight trimethyl ammonium ethyl methacrylate chloride.

The device used for the grinding of the fumed silica was a planetary grinder, MMS (Macchine Macina Smalto).

The fumed silica suspension thus obtained had the required granulometry, measured by means of a Sedigraph™ 5100 granulometer from Micromeritics.

Test N° 14

This test was of a mortar according to the present invention, having a 450 kg/M$^3$ cement content, a W/C ratio of 0.60, and 30% (dry weight, based on the dry weight of cement) of an aqueous suspension of mixed calcium carbonate-talcum (75%–25% by weight), having a 60% dry matter content, obtained by co-grinding a mixture of calcium carbonate-talcum (75%–25% by weight) to a median diameter equal to 0.74 μm, measured with the Sedigraph™ 5100, in the presence of 2.5% (dry weight, based on the dry weight of the mixture of calcium carbonate-talcum) of a totally soda neutralized copolymer comprising:

- 95.0% by weight acrylic acid, and
- 5.0% by weight tristyrylphenol methacrylate with 25 units of ethylene oxide.

The procedure and equipment used for grinding the mixed calcium carbonate-talcum are identical to those of test N° 4, above.

Test N° 15

This was of a mortar according to the present invention, having a 450 kg/m$^3$ cement content, a W/C ratio of 0.48, and 30% (dry weight, based on the dry weight of cement) of an aqueous suspension of chalk having a 59.9% dry matter content, obtained by grinding a chalk suspension to a granulometry in which 75.2% of the particles have a diameter less than 2 μm, and 30.7% of the particles have a diameter less than 1 μm, measured with the Sedigraph™ 5100, in the presence of 0.30% (dry weight based on the dry weight of chalk) of a non-neutralized copolymer comprising:

- 14.1% by weight acrylic acid,
- 3.4% by weight methacrylic acid, and
- 82.5% by weight methoxy-PEG 2000 methacrylate.

The procedure and equipment used for grinding the chalk are identical to those of test N° 4, above.

Test N° 16

This test was of a mortar according to the present invention, having a 450 kg/m$^3$ cement content, a W/C ratio of 0.52, and 30% (dry weight, based on the dry weight of cement) of an aqueous suspension of precipitated calcium carbonate (PCC) having a 59.8% dry matter content, obtained by grinding a PCC suspension to a granulometry such that 96.8% of the particles have a diameter of less than 2 μm, and 81.4% of the particles have a diameter less than 1 μm, measured with the Sedigraph™ 5100, in the presence of 0.80% (dry weight based on the dry weight of PCC) of a 50 mol. % triethanolamine neutralized copolymer comprising:

- 42.0% by weight acrylic acid,
- 42.0% by weight acrylamide,
- 11.0% by weight ethylene glycol methacrylate condensed with toluene diisocyanate and nonylphenol with 50 units of ethylene oxide, and
- 5.0% by weight ethyl acrylate.

The procedure and equipment used for grinding the PCC are identical to those of test N° 4.

Test N° 17

This test was of a mortar according to the present invention, having a 450 kg/m$^3$ cement content, a W/C ratio of 0.52, and 30% (dry weight, based on the dry weight of cement) of an aqueous suspension of dolomite having a 59.5% dry matter content, obtained by grinding a dolomite suspension to a granulometry such that 66.0% of the particles have a diameter less than 2 μm and 42.3% of the particles have a diameter less than 1 μm, measured with the Sedigraph™ 5100, in the presence of 0.80% (dry weight based on the dry weight of dolomite) of a 85 mol. % ammonia neutralized copolymer comprising:

- 76.0% by weight acrylic acid,
- 15.0% by weight 2-acrylamido-2-methyl-1-propane sulfonic acid, and
- 9.0% by weight itaconic acid.

The procedure and equipment used for grinding the dolomite are identical to those of test N° 4.

Test N° 18

This test was of a mortar according to the present invention, having a 450 kg/m$^3$ cement content, a W/C ratio of 0.50, and 30% (dry weight, based on the dry weight of cement) of an aqueous suspension of silica having a 58.2% dry matter content, obtained by grinding a silica suspension to a median diameter equal to 2.51 μm, measured with the Sedigraph™ 5100, in the presence of 0.50% (dry weight based on the dry weight of silica) of a totally lithium neutralized homopolymer of methacrylic acid.

The silica was ground in a one liter beaker containing 1 kg of grinding beads with a diameter between 0.6 to 1 mm.

Test N° 19

This test was of a mortar according to the present invention, having a 450 kg/m$^3$ cement content, a W/C ratio of 0.56, and 10% (dry weight, based on the dry weight of cement) of an aqueous suspension of zeolite having a 30.6% dry matter content obtained by grinding a zeolite suspension to a median diameter equal to 1.67 μm, measured with the Sedigraph™ 5100, in the presence of 0.50% (dry weight based on the dry weight of zeolite) of sodium polyaspartate.

The procedure and the equipment used for the grinding of the zeolite are identical to those of test N° 18.

Test N° 20

This test was of a mortar according to the present invention, having a 450 kg/m$^3$ cement content, a W/C ratio of 0.68, and 30% (dry weight, based on the dry weight of cement) of an aqueous suspension of zeolite having a 30.6% dry matter content obtained by grinding a zeolite suspension to a median diameter equal to 1.67 μm, measured with the Sedigraph™ 5100, in the presence of 0.50% (dry weight based on the dry weight of zeolite) of sodium polyaspartate.

The procedure and the equipment used for grinding the zeolite are identical to those of test N° 18.

Test N° 21

This test was of a mortar according to the present invention, having a 450 kg/m$^3$ cement content, a W/C ratio of 0.61, and 30% (dry weight, based on the dry weight of cement) of an aqueous suspension of fly ash having a 39.2% dry matter content obtained by grinding a fly ash suspension to a median diameter equal to 5.27 μm, measured with the Sedigraph™ 5100, in the presence of 0.50% (dry weight based on the dry weight of fly ash) of sodium polynaphthalene sulfonate.

The procedure and equipment used for grinding the fly ash are identical to those of test N° 18.

Test N° 22

This test was of a mortar according to the present invention, having a 450 kg/m$^3$ cement content, a W/C ratio of 0.68, and 30% (dry weight, based on the dry weight of cement) of an aqueous suspension of diatomite with a 42.2% dry matter content obtained by grinding a diatomite suspension to a median diameter equal to 4.78 µm, measured with the Sedigraph™ 5100, in the presence of 0.50% (dry weight, based on the dry weight of diatomite) of sodium lignosulfonate.

The procedure and equipment used for grinding the diatomite are identical to those of test N° 18.

Test N° 23

This test was of a mortar according to the present invention, having a 450 kg/m³ cement content, a W/C ratio of 0.57 and using 30% (dry weight, based on the dry weight of cement) of an aqueous suspension of metakaolin with a 33.6% dry matter content obtained by grinding a metakaolin suspension to a median diameter equal to 3.46 µm, measured with the Sedigraph™ 5100, in the presence of 0.50% (dry weight, based on the dry weight of metakaolin) of a mixture composed of 90% by weight of a sodium polyacrylate and 10% by weight of a surfactant commercialized by BASF under the trade name Pluronic™ PE 3100.

The procedure and equipment used for grinding the metakaolin are identical to those of test N° 18.

Test N° 24

This test was of a mortar according to the present invention, having a 450 kg/m³ cement content, a W/C ratio of 0.56 and using 30% (dry weight, based on the dry weight of cement) of an aqueous suspension of slag with a 52.4 % dry matter content obtained by grinding a slag suspension to a median diameter equal to 10.64 µm, measured with the Sedigraph™ 5100, in the presence of 0.50% (dry weight, based on the dry weight of slag) of a totally soda neutralized copolymer comprising:

54.5% by weight acrylic acid, 34.6% by weight ethylene glycol methacrylate phosphate, 10.8% by weight methylmethacrylate.

The procedure and equipment used for grinding the slag are identical to those of test N° 18.

For the different tests, the results of compression strength measurements at 2 days, determined by the same method as described in the previous examples, are set forth in Tables IVa and IVb, below.

The results of Tables IVa and IVb, above, show that that the compression strength, at young ages (i.e., strength at 2 days) of a mortar according to the present invention are significantly improved by a suspension or slurry of different ground fillers with different types of grinding aid agent.

It is noted that one of skill in the art, who has read the previous examples relating to mortars, could reliably predict that the performance of concretes which are composed of the same mortars, with an addition of gravel, would likewise have improved properties. In the same manner, grouts (mortars without sand) should show the same improvements.

The priority document of the present application, French application 0013661, filed Oct. 25, 2000, is incorporated herein by reference.

What is claimed as new and is intended to be secured by Letters Patent is:

1. A method of improving the strength at young ages of a cement matrix or hydraulic binder comprising:

adding an aqueous suspension comprising a ground mineral filler and at least one grinding aid agent to a cement or hydraulic binder, wherein the grinding aid agent comprises synthetic copolymers prepared by polymerizing ethylenically unsaturated monomers, and wherein the monomers comprise (i) at least one anionic monomer, and either (ii) at least one alkoxy-, aryloxy-, alkylaryloxy- or arylalkyloxy-polyalkylene glycol ethylenic ester, ethylenic ether or ethylenic urethane monomer, or (iii) at least one non-ionic monomer, or (ii) and (iii).

2. The method according to claim 1, wherein (iii) is present.

3. The method according to claim 1, wherein (ii) is present.

4. The method according to claim 1, wherein the ethylenically unsaturated monomers further comprise (iv) at least one cationic monomer.

TABLE IVa

| TEST N° | REFERENCE 12 | INVENTION 13 | INVENTION 14 | INVENTION 15 | INVENTION 16 | INVENTION 17 |
|---|---|---|---|---|---|---|
| Weight of cement in g | 450 | 450 | 450 | 450 | 450 | 450 |
| Weight of sand in g | 1569 | 1487 | 1388 | 1436 | 1355 | 1485 |
| Weight of mineral suspension or slurry in g | 0 | 181 | 229 | 225 | 226 | 226 |
| Effective addition of water in g | 248 | 267 | 269 | 214 | 233 | 234 |
| Effective water/cement ratio | 0.55 | 0.59 | 0.60 | 0.48 | 0.52 | 0.52 |
| Compression strength in kN at 2 days | 40 | 42.4 | 44.4 | 64 | 55.1 | 42.2 |
| Gain in strength in % at 2 days | 0 | 6 | 11 | 60 | 38 | 5 |

TABLE IVb

| TEST N° | REFERENCE 18 | INVENTION 19 | INVENTION 20 | INVENTION 21 | INVENTION 22 | INVENTION 23 | INVENTION 24 |
|---|---|---|---|---|---|---|---|
| Weight of cement in g | 450 | 450 | 450 | 450 | 450 | 450 | 450 |
| Weight of sand in g | 1499 | 1494 | 1348 | 1406 | 1395 | 1490 | 1443 |
| Weight of mineral suspension or slurry in g | 232 | 147 | 441 | 344 | 319 | 134 | 258 |
| Effective addition of water in g | 225 | 252 | 306 | 275 | 246 | 257 | 252 |
| Effective water/cement ratio | 0.50 | 0.56 | 0.68 | 0.61 | 0.55 | 0.57 | 0.56 |
| Compressive strength in kN at 2 days | 51.3 | 56.0 | 48.0 | 48.4 | 53.6 | 45.2 | 48.4 |
| Gain in strength in % at 2 days | 28 | 40 | 20 | 21 | 34 | 13 | 21 |

5. The method according to claim 1, wherein the ethylenically unsaturated monomer comprises at least one monomer selected from the group consisting of acrylic acid, methacrylic acid, itaconic, crotonic, fumaric acid, maleic anhydride, isocrotonic acid, aconitic acid, mesaconic acid, sinapic acid, undecylenic acid, angelic acid, 2-acrylamido-2-methyl-1-propane sulphonic acid, 2-methacrylamido-2-methyl-1-propane sulphonic acid, 3-methacrylamido-2-hydroxy-1-propane sulphonic acid, allylsulphonic acid, methallylsulphonic acid, allyloxybenzene sulphonic acid, methallyloxybenzene sulphonic acid, 2-hydroxy-3-(2-propenyloxy)propane sulphonic acid, 2-methyl-2-propene-1-sulphonic acid, ethylene sulphonic acid, propene sulphonic acid, 2-methyl propene sulphonic acid, styrene sulphonic acid, vinyl sulphonic acid; sodium methallylsulphonate, sulphoethyl or sulphopropyl acrylate or methacrylate; sulphomethacrylamide, sulphomethylmethacrylamide; and alkylene glycol acrylate or methacrylate phosphate or phosphonate or sulphate or sulphonate, or vinyl phosphonate.

6. The method according to claim 2, wherein (iii) is at least one monomer selected from the group consisting of acrylamide or methacrylamide or derivatives thereof; $C_1$ to $C_{40}$ acrylic or methacrylic acid alkyl-esters; vinyl acetate, vinylpyrrolidone, styrene, and α-methyl-styrene.

7. The method according to claim 3, wherein (ii) is at least one alkoxy-, aryloxy-, alkylaryloxy- or arylalkyloxy-polyalkylene glycol ethylenic urethane monomer; an alkoxy-, aryloxy-, alkylaryloxy- or arylalkyloxy-polyalkylene glycol ethylenic ester monomer; an oxyalkylated, oxyarylated, oxyarylalkylated or oxyalkylarylated alkoxy-, aryloxy-, alkylaryloxy- or arylalkyloxy-acrylate or methacrylate or hemimaleate having an alkylene, arylene, alkylarylene or arylalkylene oxide number between 1 and 120; and an alkoxy-, aryloxy-, alkylaryloxy- or arylalkyloxy-polyalkylene glycol ethylenic ether monomer.

8. The method according to claim 4, wherein (iv) is at least one selected from the group consisting of quaternized or unquaternized methacrylamido propyl trimethyl ammonium chloride or sulfate or the corresponding acrylates or acrylamides; quaternized or unquaternized trimethyl ammonium ethyl methacrylate chloride or sulfate or the corresponding acrylates or acrylamides; and dimethyldiallyl ammonium chloride.

9. The method according to claim 1, wherein (i) is selected from the group consisting of acrylic acid, methacrylic acid, 2-acrylamido-2-methyl-1-propane sulphonic acid, 2-methacrylamido-2-methyl-1-propane sulphonic acid, 3-methacrylamido-2-hydroxy-1-propane sulphonic acid, allylsulphonic acid, methallylsulphonic acid, allyloxybenzene sulphonic acid, methallyloxybenzene sulphonic acid, 2-hydroxy-3-(2-propenyloxy)propane sulphonic acid, 2-methyl-2-propene-1-sulphonic acid, ethylene sulphonic acid, propene sulphonic acid, 2-methyl sulphonic acid, styrene sulphonic acid, vinyl sulphonic acid, sodium methallylsulphonate; sulphopropyl acrylate or methacrylate; sulphomethylacrylamide, sulphomethylmethacrylamide; alkylene glycol acrylate or methacrylate phosphate or phosphonate or sulphate or sulphonate; itaconic acid, maleic anhydride, sodium methallylsulphonate, and styrene sulphonic acid.

10. The method according to claim 1, wherein (i) is selected from the group consisting of acrylic acid, methacrylic acid, 2-acrylamido-2-methyl-1-propane sulphonic acid, ethylene sulphonic acid, propene sulphonic acid, 2-methyl sulphonic acid, ethylene glycol methacrylate phosphate, and ethylene glycol acrylate phosphate.

11. The method according to claim 2, wherein (iii) is selected from the group consisting of ethyl acrylate and acrylamide.

12. The method according to claim 3, wherein (ii) is selected from the group consisting of the reaction products of alkyloxy-polyalkylene glycol with a polymerizable unsaturated isocyanate; and the reaction products of methoxy-polyethylene glycol with an acrylic, methacrylic, vinyl or allyl isocyanate wherein the polyethylene glycol has a molecular weight greater than 300.

13. The method according to claim 3, wherein (ii) is selected from the group consisting of alkoxy-, aryloxy-, alkylaryloxy- or arylalkyloxy-polyalkylene glycol acrylates, methacrylates or hemialeates; oxyalkylated, oxyarylated, oxyarylalkylated or oxyalkylarylated alkoxy-, aryloxy-, alkylaryloxy- or arylalkyloxy-polyalkylene glycol acrylates, methacrylates or hemialeates having alkylene, arylene, alkylarylene or arylalkylene oxide numbers between 1 and 120; and alkyloxy-polyethylene glycol acrylates, methacrylates or hemialeates, wherein the polyethylene glycol has a molecular weight greater than 300.

14. A method of preparing a cement matrix or hydraulic binder comprising:
adding an aqueous suspension comprising a ground mineral filler and at least one grinding aid agent to a cement or hydraulic binder,
wherein the grinding aid agent comprises a polyaspartate or derivative thereof.

15. The method according to claim 1, wherein the grinding aid agent is fractionated subsequent to polymerizing.

16. The method according to claim 1, wherein the grinding aid agent has a completely acidic form.

17. The method according to claim 1, wherein the grinding aid agent is partially or completely neutralized by one or more neutralization agents having a monovalent function or polyvalent function.

18. The method according to claim 17, wherein the neutralization agent has a monovalent function and is selected from the group consisting of compounds containing alkaline cations, and primary or secondary aliphatic and/or cyclic amines.

19. The method according to claim 18, wherein the neutralization agent is alkaline cations and are selected from the group consisting of sodium, potassium, lithium, and ammonium or primary or secondary aliphatic and/or cyclic amines selected from the group consisting of ethanolamines, mono- and diethylamine, and cyclohexylamine.

20. The method according to claim 17, wherein the neutralization agent has a polyvalent function and is selected from the group consisting of compounds containing divalent alkaline-earth cations, compounds containing trivalent cations, and compounds containing cations having a valency higher than trivalent.

21. The method according to claim 20, wherein the neutralization agent is divalent alkaline-earth cations selected from the group consisting of magnesium, calcium, and zinc, or the neutralization agent is aluminium.

22. The method according to claim 1, wherein the mineral filler is selected from the group consisting of ultrafine fillers having a median diameter less than or equal to 20 μm measured with a Cilas™ 850 or Sedigraph™ 5100 type granulometer.

23. The method according to claim 1, wherein the mineral filler is selected from the group consisting of natural calcium carbonates, chalk, calcite, marble, limy rocks, precipitated calcium carbonate, barium carbonate, dolomite, talc, ground silica, silica, fumed silica, fumed titanium dioxide, diatomites, iron oxides, manganese oxides, titanium dioxide, chalk, kaolin, meta-kaolin, clays, mica, plasters, fly ash, slag, calcium sulphate, zeolites, basalt, barium sulphate, aluminium trihydroxide and mixtures thereof.

24. The method according to claim 1, wherein the aqueous suspension has a concentration of dry matter ranging from 10% to 85% by weight.

25. A cement matrix or a hydraulic binder, prepared by the method of claim 1.

26. A cement matrix or hydraulic binder, prepared by the method of claim 2.

27. A cement matrix or hydraulic binder, prepared by the method of claim 4.

28. A cement matrix or hydraulic binder, prepared by the method of claim 14.

29. A cement matrix or hydraulic binder, prepared by the method of claim 15.

30. A cement matrix or hydraulic binder, prepared by the method of claim 16.

31. A cement matrix or hydraulic binder, prepared by the method of claim 17.

32. A cement matrix or hydraulic binder, prepared by the method of claim 23.

33. A concrete comprising the cement matrix or hydraulic binder according to claim 25.

34. A mortar comprising the cement matrix or hydraulic binder according to claim 25.

35. A hydraulic concrete comprising the cement matrix or hydraulic binder according to claim 25.

36. A grout comprising the cement matrix or hydraulic binder according to claim 25.

37. A composition based on cement and/or semihydrate calcium sulphate comprising the cement matrix or hydraulic binder according to claim 25.

38. A building, offshore construction, bridge petroleum cement or road comprising the cement matrix or hydraulic binder according to claim 25.

39. A method of preparing a cement matrix or hydraulic binder comprising:

adding an aqueous suspension comprising a ground mineral filler and at least one grinding aid agent to a cement or hydraulic binder, wherein the grinding aid agent comprises a homopolymer or copolymer prepared by polymerizing ethylenically unsaturated monomers which comprise (iv) at least one cationic monomer.

40. The method according to claim 39, wherein (iv) is at least one selected from the group consisting of quaternized or unquaternized methacrylamido propyl trimethyl ammonium chloride or sulfate or the corresponding acrylates or acrylamides; quaternized or unquaternized trimethyl ammonium ethyl methacrylate chloride or sulfate or the corresponding acrylates or acrylamides; and dimethyldiallyl ammonium chloride.

41. The method according to claim 39, wherein the mineral filler is selected from the group consisting of natural calcium carbonates, chalk, calcite, marble, limy rocks, precipitated calcium carbonate, barium carbonate, dolomite, talc, ground silica, silica, fumed silica, fumed titanium dioxide, diatomites, iron oxides, manganese oxides, titanium dioxide, chalk, kaolin, meta-kaolin, clays, mica, plasters, fly ash, slag, calcium sulphate, zeolites, basalt, barium sulphate, aluminium trihydroxide and mixtures thereof.

42. The method according to claim 39, wherein the aqueous suspension has a concentration of dry matter ranging from 10% to 85% by weight.

43. A cement matrix or a hydraulic binder, prepared by the method of claim 39.

44. The method according to claim 40, wherein the mineral filler is selected from the group consisting of natural calcium carbonates, chalk, calcite, marble, limy rocks, precipitated calcium carbonate, barium carbonate, dolomite, talc, ground silica, silica, fumed silica, fumed titanium dioxide, diatomites, iron oxides, manganese oxides, titanium dioxide, chalk, kaolin, meta-kaolin, clays, mica, plasters, fly ash, slag, calcium sulphate, zeolites, basalt, barium sulphate, aluminium trihydroxide and mixtures thereof.

45. The method according to claim 40, wherein the aqueous suspension has a concentration of dry matter ranging from 10% to 85% by weight.

46. A cement matrix or a hydraulic binder, prepared by the method of claim 40.

* * * * *